United States Patent
Jiang

(10) Patent No.: US 6,571,989 B1
(45) Date of Patent: Jun. 3, 2003

(54) METERING DEVICE FOR RELEASING WATER AND DETERGENT

(76) Inventor: Zhen-Yuan Jiang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/336,778

(22) Filed: Jan. 2, 2003

(30) Foreign Application Priority Data

Oct. 4, 2002 (TW) ...................................... 91216141 U

(51) Int. Cl.[7] .............................................. B05B 7/00
(52) U.S. Cl. ............................. 222/145.7; 222/145.1; 222/287; 222/395; 222/630; 239/310; 239/318; 68/12.18; 68/17 R; 137/888; 137/891; 137/893
(58) Field of Search .......................... 222/55, 57, 135, 222/138, 145.1, 145.5, 145.6, 145.7, 287, 394, 395, 630, 637; 239/310, 318; 68/12.18, 17 R; 141/104, 105; 137/888, 891–893, 896, 897

(56) References Cited

U.S. PATENT DOCUMENTS

| | | | | |
|---|---|---|---|---|
| 2,316,781 A | * | 4/1943 | Fox | 239/310 |
| 2,672,366 A | * | 3/1954 | Deport | 239/310 |
| 2,719,704 A | * | 10/1955 | Anderson et al. | 261/18.1 |
| 3,052,417 A | * | 9/1962 | Daniel | 239/314 |
| 3,091,402 A | * | 5/1963 | Palmer | 239/315 |
| 3,118,610 A | * | 1/1964 | Techler | 239/304 |
| 3,180,580 A | * | 4/1965 | Schedel | 239/318 |
| 3,186,643 A | * | 6/1965 | George et al. | 239/318 |
| 3,632,046 A | * | 1/1972 | Hengesbach | 239/318 |
| 4,200,206 A | * | 4/1980 | Chase et al. | 222/144.5 |
| 4,369,921 A | * | 1/1983 | Beiswenger et al. | 239/317 |
| 4,475,689 A | * | 10/1984 | Hauger et al. | 239/318 |
| 4,527,740 A | * | 7/1985 | Gunzel et al. | 239/318 |
| 6,419,166 B1 | * | 7/2002 | Brzezinski et al. | 239/310 |
| 2003/0038182 A1 | * | 2/2003 | Timmes et al. | 239/10 |

* cited by examiner

Primary Examiner—J. Casimer Jacyna

(57) ABSTRACT

A metering device for releasing water and detergent has a three-way connector, a water quantity adjustment device, a detergent quantity adjustment device, and a detergent bottle. The three-way connector has a three-way channel, a first end connected to the detergent quantity adjustment device, a second end connected to the water quantity adjustment device, and a third end connected to a water outlet hose. The water quantity adjustment device has a swivel ring and a water amount control ring engaging with the swivel ring. The detergent quantity adjustment device has a rotating ring and a detergent amount control ring engaging with the rotating ring. The detergent bottle engages with the detergent amount control ring.

4 Claims, 4 Drawing Sheets

METERING DEVICE FOR RELEASING WATER AND DETERGENT

BACKGROUND OF THE INVENTION

The present invention relates to a metering device for releasing water and detergent. More particularly, the present invention relates to a metering device for releasing water and detergent in order to adjust an amount of detergent through a detergent quantity adjustment device.

U.S. Pat. No. 6,257,786 has disclosed a metering device for storage, mixture and release of detergent with water. Only a single valve is disposed between a reservoir and a fluid conduit to permit selective mixing of water and detergent. However, the detergent quantity cannot be adjusted by the single valve.

SUMMARY OF THE INVENTION

An object of the present invention is to provide a metering device for releasing water and detergent in order to adjust an amount of detergent through a detergent quantity adjustment device.

Another object of the present invention is to provide a metering device for releasing water and detergent in order to adjust an amount of water through a water quantity adjustment device.

Accordingly, a metering device for releasing water and detergent comprises a three-way connector, a water quantity adjustment device, a detergent quantity adjustment device, and a detergent bottle. The three-way connector has a three-way channel, a first end connected to the detergent quantity adjustment device, a second end connected to the water quantity adjustment device, and a third end connected to a water outlet hose. The first end of the three-way connector has a first outer thread. The second end of the three-way connector has a second outer thread. The third end of the three-way connector has a third outer thread. The water quantity adjustment device has a swivel ring and a water amount control ring. The swivel ring has an inner thread engaging with the second outer thread of the three-way connector, a through aperture, an engagement groove, a plurality of engagement recesses, a first guidance hole, a second guidance hole, and a third guidance hole. The water amount control ring has an inner thread, a protruded block having a round hole and a circular aperture to receive a compression spring and a check block, and a distal end having an inner thread. A hollow post is disposed on the protruded block to be inserted in the through aperture of the swivel ring. The hollow post has a recess hole. A gasket surrounds the round hole of the water amount control ring. The detergent quantity adjustment device has a rotating ring and a detergent amount control ring. The rotating ring has an inner thread engaging with the first outer thread of the three-way connector, a center through hole, a click groove, a plurality of click recesses, a first guide hole, a second guide hole, and a third guide hole. The detergent amount control ring has an inner thread, a protruded disk having a circular hole and a round aperture to receive a coiled spring and a click block, and a distal end having an inner thread. A hollow pillar is disposed on the protruded disk to be inserted in the center through hole of the rotating ring. The hollow pillar has a blind hole. The detergent bottle has an outer thread to engage with the inner thread of the detergent amount control ring.

DETAILED DESCRIPTION OF THE INVENTION

Figure 1:
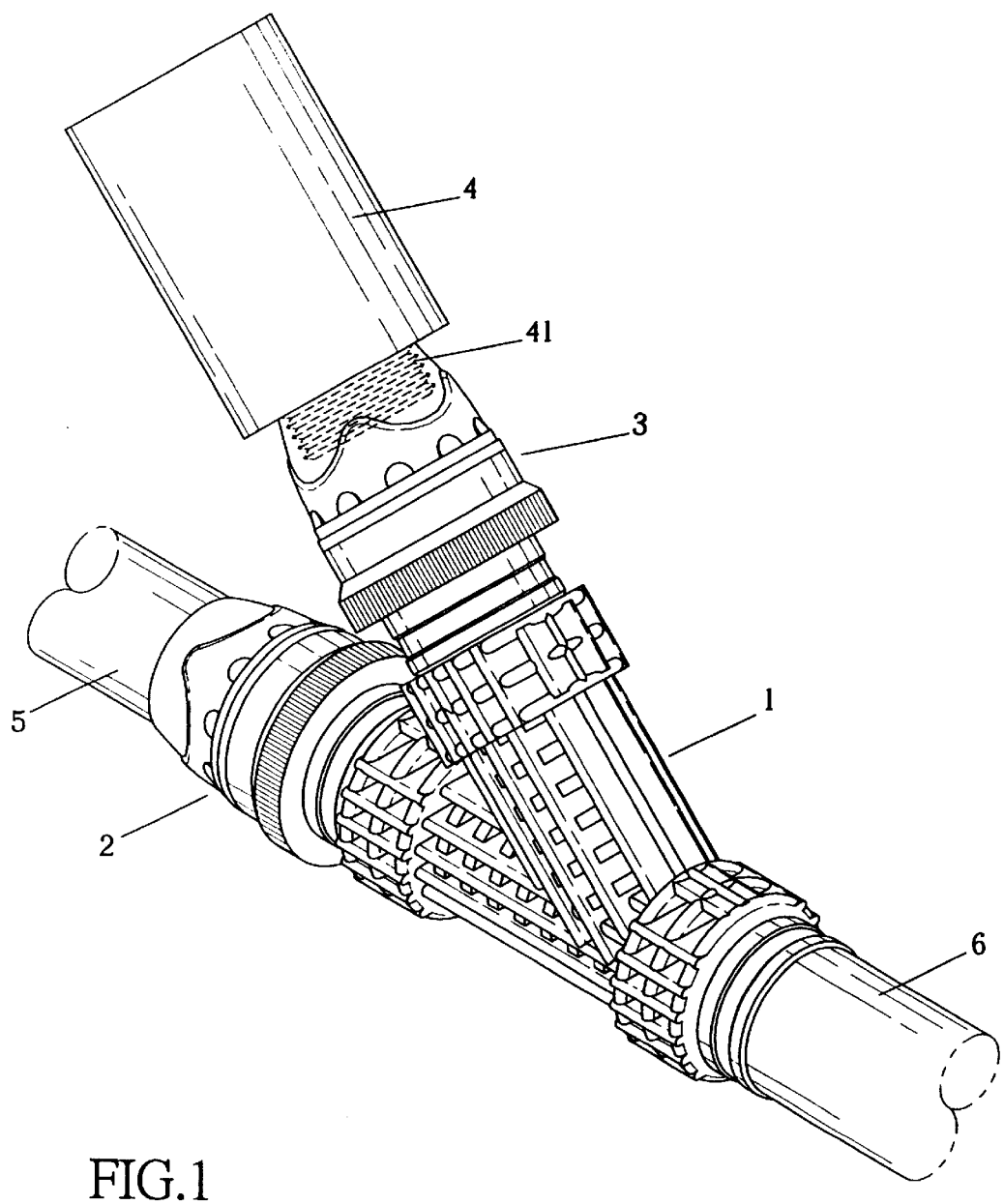
FIG. 1 is a perspective assembly view of a metering device for releasing water and detergent of a preferred embodiment in accordance with the present invention.
Figure 2:
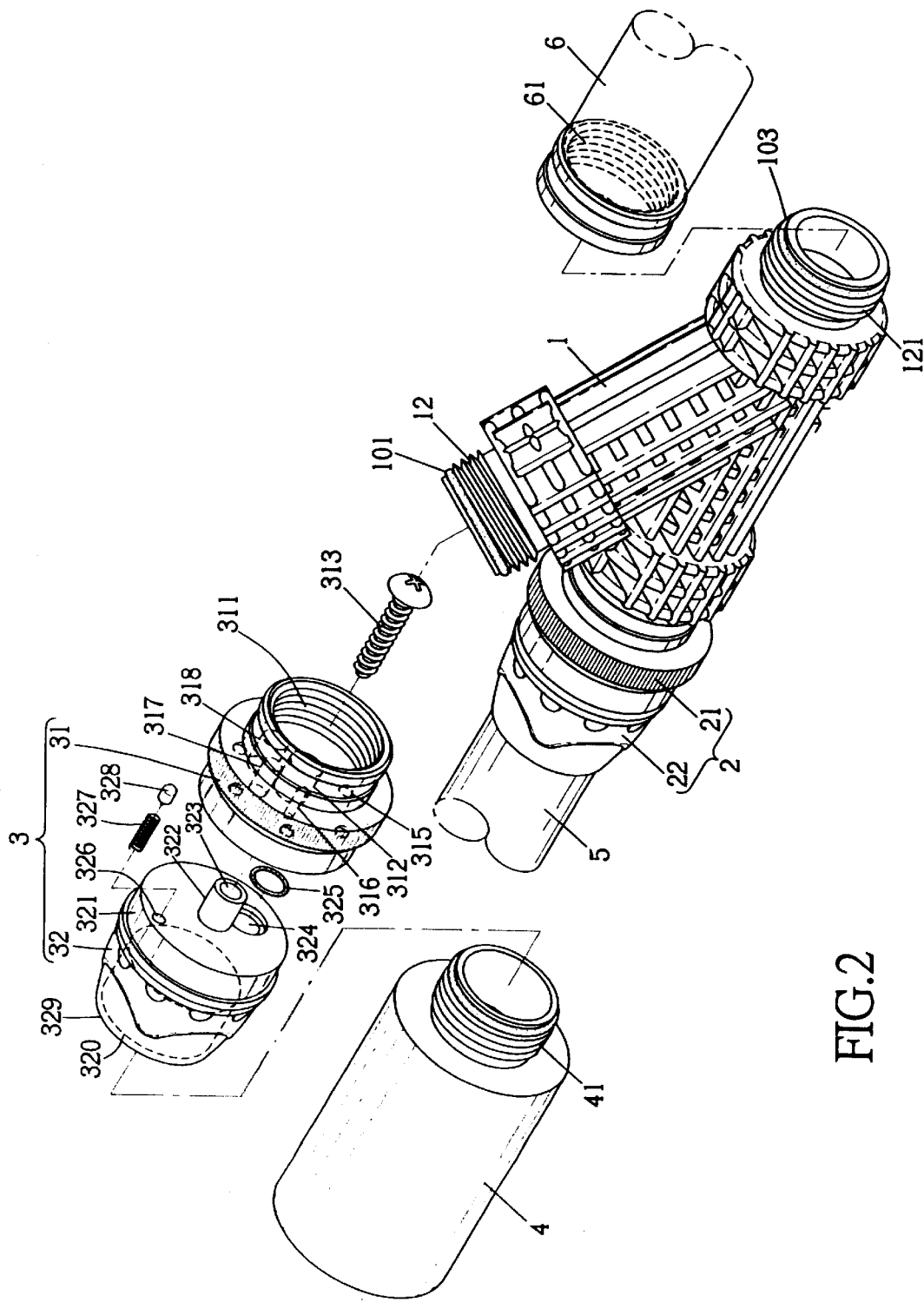
FIG. 2 is a perspective exploded view of a metering device for releasing water and detergent of a preferred embodiment in accordance with the present invention.
Figure 3:
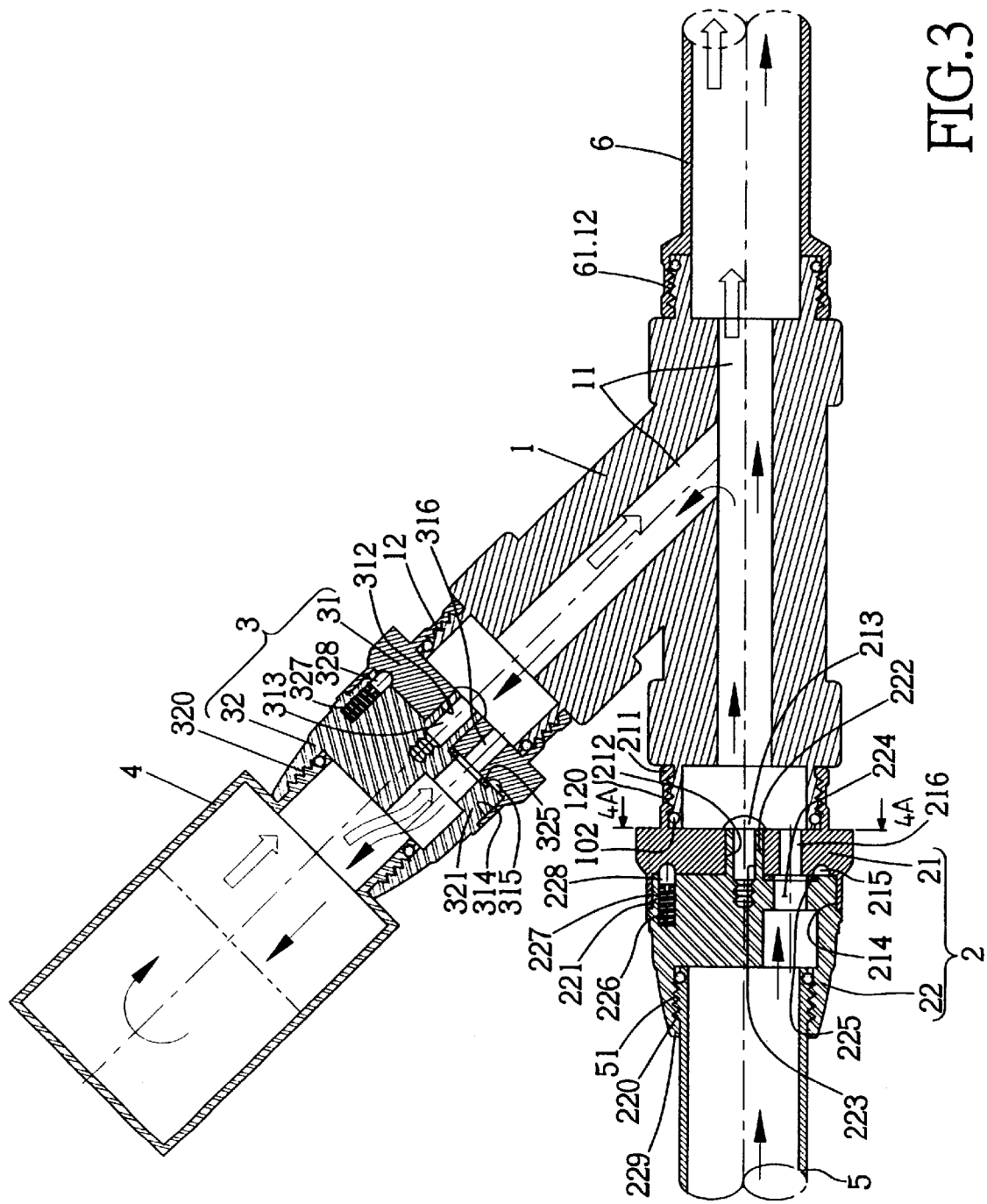
FIG. 3 is a sectional assembly view of a metering device for releasing water and detergent of a preferred embodiment in accordance with the present invention.
Figure 5:
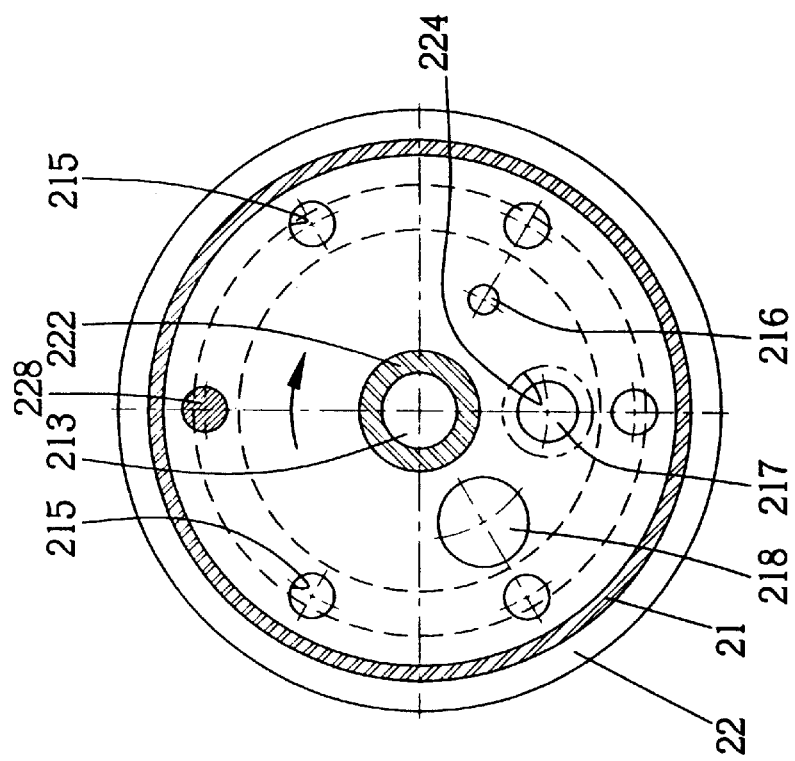
FIG. 5 is a schematic view illustrating a rotation of a water quantity adjustment device.
Figure 4:
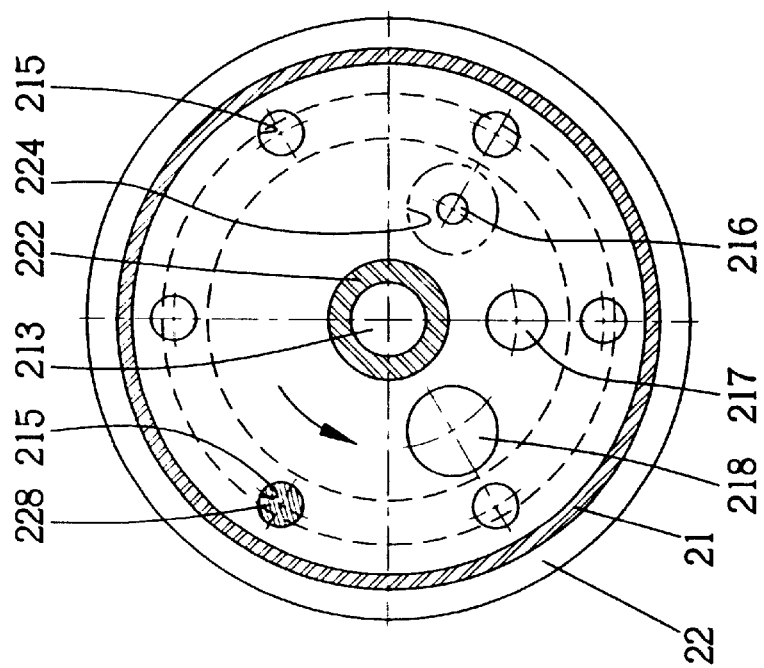
FIG. 4 is a sectional view taken along line 4A—4A in FIG. 3.

Referring to FIGS. 1 to 5, a metering device for releasing water and detergent comprises a three-way connector 1, a water quantity adjustment device 2, a detergent quantity adjustment device 3, and a detergent bottle 4.

The three-way connector 1 has a three-way channel 11, a first end 101 connected to the detergent quantity adjustment device 3, a second end 102 connected to the water quantity adjustment device 2, and a third end 102 connected to a water outlet hose 6.

The first end 101 of the three-way connector 1 has a first outer thread 12.

The second end 102 of the three-way connector 1 has a second outer thread 120.

The third end 103 of the three-way connector 1 has a third outer thread 121.

The water quantity adjustment device 2 has a swivel ring 21 and a water amount control ring 22.

The swivel ring 21 has an inner thread 211 engaging with the second outer thread 120 of the three-way connector 1, a through aperture 212, an engagement groove 214, a plurality of engagement recesses 215, a first guidance hole 216, a second guidance hole 217, and a third guidance hole 218.

The water amount control ring 22 has an inner thread 220, a protruded block 221 having a round hole 224 and a circular aperture 226 to receive a compression spring 227 and a check block 228, and a distal end 229 having an inner thread 220.

A hollow post 222 is disposed on the protruded block 221 to be inserted in the through aperture 212 of the swivel ring 21.

The hollow post 222 has a recess hole 223.

A gasket 225 surrounds the round hole 224 of the water amount control ring 22.

The detergent quantity adjustment device 3 has a rotating ring 31 and a detergent amount control ring 32.

The rotating ring 31 has an inner thread 311 engaging with the first outer thread 12 of the three-way connector 1, a center through hole 312, a click groove 314, a plurality of click recesses 315, a first guide hole 316, a second guide hole 317, and a third guide hole 318.

The detergent amount control ring 32 has an inner thread 320, a protruded disk 321 having a circular hole 324 and a round aperture 326 to receive a coiled spring 327 and a click block 328, and a distal end 329 having an inner thread 320.

A hollow pillar 322 is disposed on the protruded disk 321 to be inserted in the center through hole 312 of the rotating ring 31.

The hollow pillar 322 has a blind hole 323.

The detergent bottle 4 has an outer thread 41 to engage with the inner thread 320 of the detergent amount control ring 32.

A screw 213 is inserted through the through aperture 212 of the swivel ring 21 and inserted in the recess hole 223 of the hollow post 222 to fasten the swivel ring 21 and the water amount control ring 22.

A bolt 313 is inserted through the center through hole 312 of the rotating ring 31 and inserted in the blind hole 323 of the hollow pillar 322 to fasten the rotating ring 31 and the hollow pillar 322.

A washer 325 surrounds the circular hole 324 of the detergent amount control ring 32.

A water inlet hose 5 is connected to the water amount control ring 22.

An assembly of the metering device for releasing water and detergent is described as follows.

The compression spring 227 and the check block 228 are inserted in the circular aperture 226 of the water amount control ring 22. The gasket 225 surrounds the round hole 224 of the water amount control ring 22. The hollow post 222 is disposed on the protruded block 221 to be inserted in the through aperture 212 of the swivel ring 21. The screw 213 is inserted through the through aperture 212 of the swivel ring 21 and inserted in the recess hole 223 of the hollow post 222 to fasten the swivel ring 21 and the water amount control ring 22.

The check block 228 engages with one of the engagement groove 214 of the swivel ring 21. The spring 327 and the click block 328 are inserted in the round aperture 326 of the detergent amount control ring 32. The washer 325 surrounds the circular hole 324 of the detergent amount control ring 32. The hollow pillar 322 is disposed on the protruded disk 321 to be inserted in the center through hole 312 of the rotating ring 31. The bolt 313 is inserted through the center through hole 312 of the rotating ring 31 and inserted in the blind hole 323 of the hollow pillar 322 to fasten the rotating ring 31 and the hollow pillar 322. The click block 328 engages with one of the click recesses 315 of the rotating ring 31.

When water flows from the water inlet hose 5 to the round hole 224 of the water amount control ring 22 and one of the first guidance hole 216, the second guidance hole 217, and the third guidance hole 218 of the swivel ring 21 in order to enter the three-way channel 11 of the three-way connector 1, a portion of water will enter the first end 101 of the three-way connector 1, and another portion of water will enter the third end 103 of the three-way connector 1. The detergent in the detergent bottle 4 will flow from one of the first guide hole 316, the second guide hole 317, and the third guide hole 318 of the rotating ring 31 to the first end 101 of the three-way connector 1 in order to mix with water to form a mixture. Then the mixture will flow from the first end 101 of the three-way connector 1 to the third end 103 of the three-way connector 1 and the water outlet hose 6.

It is an option that the first guide hole 316 is larger than the second guide hole 317 and the second guide hole 317 is larger than the third guide hole 318.

The present invention has the following advantages.

Since the first guide hole 316 is larger than the second guide hole 317 and the second guide hole 317 is larger than the third guide hole 318, a rotation of the rotating ring 31 will control an amount of detergent entering the first end 101 of the three-way connector 1.

Since the rotating ring 31 will stop detergent from entering the first end 101 of the three-way connector 1 or control an amount of detergent entering the first end 101 of the three-way connector 1, a ratio of detergent entering the first end 101 of the three-way connector 1 will be varied.

The features of the water quantity adjustment device 2 and the detergent quantity adjustment device 3 are novel and the result of changing the ratio of detergent entering the first end 101 of the three-way connector 1 is significant.

The present invention is not limited to the above embodiment but various modification thereof may be made. Furthermore, various changes in form and detail may be made without departing from the scope of the present invention.

I claim:

1. A metering device for releasing water and detergent comprises:

a three-way connector, a water quantity adjustment device, a detergent quantity adjustment device, and a detergent bottle, the three-way connector having a three-way channel, a first end connected to the detergent quantity adjustment device, a second end connected to the water quantity adjustment device, and a third end connected to a water outlet hose, the first end of the three-way connector having a first outer thread, the second end of the three-way connector having a second outer thread, the third end of the three-way connector having a third outer thread, the water quantity adjustment device having a swivel ring and a water amount control ring, the swivel ring having an inner thread engaging with the second outer thread of the three-way connector, a through aperture, an engagement groove, a plurality of engagement recesses, a first guidance hole, a second guidance hole, and a third guidance hole, the water amount control ring having an inner thread, a protruded block having a round hole and a circular aperture to receive a compression spring and a check block, and a distal end having an inner thread, a hollow post disposed on the protruded block to be inserted in the through aperture of the swivel ring, the hollow post having a recess hole, a gasket surrounding the round hole of the water amount control ring, the detergent quantity adjustment device having a rotating ring and a detergent amount control ring, the rotating ring having an inner thread engaging with the first outer thread of the three-way connector, a center through hole, a click groove, a plurality of click recesses, a first guide hole, a second guide hole, and a third guide hole, the detergent amount control ring having an inner thread, a protruded disk having a circular hole and a round aperture to receive a coiled spring and a click block, and a distal end having an inner thread, a hollow pillar disposed on the protruded disk to be inserted in the center through hole of the rotating ring, the hollow pillar having a blind hole, and the detergent bottle having an outer thread to engage with the inner thread of the detergent amount control ring.

2. The metering device for releasing water and detergent as claimed in claim 1, wherein a screw is inserted through the through aperture of the swivel ring and inserted in the recess hole of the hollow post to fasten the swivel ring and the water amount control ring.

3. The metering device for releasing water and detergent as claimed in claim 1, wherein a bolt is inserted through the center through hole of the rotating ring and inserted in the blind hole of the hollow pillar to fasten the rotating ring and the hollow pillar.

4. The metering device for releasing water and detergent as claimed in claim 1, wherein a washer surrounds the circular hole of the detergent amount control ring.

\* \* \* \* \*